US012679731B2

(12) United States Patent
Martinez et al.

(10) Patent No.: US 12,679,731 B2
(45) Date of Patent: Jul. 14, 2026

(54) USE OF AN ADDITIVE IN THE PRODUCTION OF COPPER(II) HYDROXIDE PHOSPHATE

(71) Applicant: Chemische Fabrik Budenheim KG, Budenheim (DE)

(72) Inventors: David Garcia Martinez, Saragossa (ES); Christian Litterscheid, Ober-Olm (DE); Franziska Welsch-Papenbreer, Waldalgesheim (DE); Rüdiger Wissemborski, Neuruppin (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 807 days.

(21) Appl. No.: 17/920,332

(22) PCT Filed: Apr. 19, 2021

(86) PCT No.: PCT/EP2021/060027
§ 371 (c)(1),
(2) Date: Oct. 20, 2022

(87) PCT Pub. No.: WO2021/213956
PCT Pub. Date: Oct. 28, 2021

(65) Prior Publication Data
US 2023/0202846 A1 Jun. 29, 2023

(30) Foreign Application Priority Data
Apr. 23, 2020 (DE) ..................... 10 2020 111 158.4

(51) Int. Cl.
*C01B 25/26* (2006.01)
*C01B 25/37* (2006.01)

(52) U.S. Cl.
CPC .......... *C01B 25/37* (2013.01); *C01P 2004/61* (2013.01); *C01P 2006/62* (2013.01); *C01P 2006/80* (2013.01)

(58) Field of Classification Search
CPC ..... C01B 25/37; C01B 25/26; C01P 2004/61; C01P 2006/62; C01P 2006/80; C01P 2004/54
USPC ....................................................... 423/309
See application file for complete search history.

(56) References Cited

U.S. PATENT DOCUMENTS

| | | | |
|---|---|---|---|
| 4,797,274 A | 1/1989 | Miki et al. | |
| 5,053,440 A | 10/1991 | Schueler et al. | |
| 6,870,026 B1 | 3/2005 | Dean | |
| 10,023,465 B2 * | 7/2018 | Wissemborski | ......... C09K 5/14 |
| 2010/0086462 A1 * | 4/2010 | Markmann | ............. C01B 25/45 |
| | | | 977/773 |
| 2019/0152796 A1 | 5/2019 | Parashar et al. | |
| 2020/0032028 A1 | 1/2020 | Fnderich et al. | |

FOREIGN PATENT DOCUMENTS

| | | | |
|---|---|---|---|
| CA | 2917497 A1 | 7/2017 | |
| CN | 1197690 A | 11/1998 | |
| CN | 106853963 A | 6/2017 | |
| CN | 107698353 A | 2/2018 | |
| CN | 107899594 A | 4/2018 | |
| DE | 3342292 A1 | 5/1985 | |
| DE | 3917294 A1 | 11/1990 | |
| DE | 4136994 A1 | 5/1993 | |
| DE | 195 43 803 A1 | 5/1997 | |
| JP | 2001-342453 A | 12/2001 | |
| WO | 2004/085305 A2 | 10/2004 | |
| WO | WO-2008009592 A2 * | 1/2008 | ............. C01B 25/45 |
| WO | WO-2018/178022 A1 | 10/2018 | |

OTHER PUBLICATIONS

Han Jian et al: "Cu2(OH)PO4pretreated by composite surfactants for the micro-domino effect: A high-efficiency Fenton catalyst for the total oxidation of dyes", Materials Letters, Elsevier, Amsterdam, NL, Bd. 166, Dec. 11, 2015 (Dec. 11, 2015), Seiten 71-74, XP029400093, ISSN: 0167-577X, DOI: 10.1016/J.MATLET. 2015. 12.046.

Fu et al., "Synthesis of Cu2(OH)PO4 Crystals with Various Morphologies and Their Catalytic Activity in Hydroxylation of Phenol", Chem. Lett., No. 42, May 29, 2013, pp. 772-774.

Bish et al., "Quantitative phase analysis using the Rietveld method", Journal of Applied Crystallography, vol. 21, Issue 2, Apr. 1988, pp. 86-91.

Hu et al., "Cu2PO4OH: Controlled synthesis of various architectures and morphology-dependent 808 nm laser-driven photothermal performance", Journal of Alloys and Compounds, vol. 695, Feb. 2017, pp. 561-566.

Zhao et al., "Copper (II) Oxide Phosphate Superstructures: Their Primarily Application as Effective Antimicrobial Materials", International Journal of Electrochemical Science, vol. 8, Issue 1, Jan. 2013, pp. 490-503.

Zhan et al., "Synthesis and Characterization of Copper Hydroxyphosphate," Journal of Zhengzhou University (Engineering Science). vol. 31, No. 2, Mar. 2010, pp. 76-79. English Abstract included.

* cited by examiner

*Primary Examiner* — Cam N. Nguyen
(74) *Attorney, Agent, or Firm* — MEDLER FERRO WOODHOUSE & MILLS PLLC

(57) ABSTRACT

A process for producing copper(II) hydroxide phosphate from a copper(II) compound and phosphoric acid is provided, as well as a copper(II) hydroxide phosphate obtainable by this process and the use of an additive in the production of copper(II) hydroxide phosphate.

16 Claims, No Drawings

1

USE OF AN ADDITIVE IN THE PRODUCTION OF COPPER(II) HYDROXIDE PHOSPHATE

CROSS REFERENCE TO RELATED APPLICATIONS

This application is a National Stage of International Application No. PCT/EP2021/060027 filed Apr. 19, 2021, which claims benefit of German Patent Application No. 10 2020 111 158.4 filed Apr. 23, 2020, both of which are herein incorporated by reference in their entirety.

SUBJECT MATTER OF THE INVENTION

The invention relates to a method for preparing copper(II) hydroxide phosphate by adding a chelating agent, to a copper(II) hydroxide phosphate obtainable by that method and to the use of a chelating agent in the production of copper(II) hydroxide phosphate.

BACKGROUND OF THE INVENTION

Copper(II) hydroxide phosphate, which is also referred to in the literature as basic copper phosphate, is used, among other things, as a plastics additive for various purposes. According to the unexamined German patent applications No. 3 917 294 A1 and 4 136 994 A1, for example, it is admixed with plastics in order to make them inscribable by means of laser beams.

From the prior art, substantially two methods are known for preparing copper(II) hydroxide phosphate, namely converting an aqueous dispersion of a copper precursor compound with phosphoric acid at normal pressure, and hydrothermal synthesis, in which the conversion is effected at elevated pressure starting from a copper precursor compound and a phosphate salt.

The term "hydrothermal synthesis" refers to a largely heterogeneous reaction n an aqueous medium above 100° C. and 1 bar in a closed reaction vessel. Under these conditions, substances that otherwise have low solubility dissolve as complexes. In this context, it is known to add additives to the aqueous reaction mixture in order to influence the structure of the reaction product copper(II) hydroxide phosphate.

For example, Zhao et al., *Int. J. Electrochem. Sci.* 8 (2013) 490-593, describes the hydrothermal synthesis of copper(II) hydroxide phosphate starting from $CuSO_4*5H_2O$ and $(NH_4)_2HPO_1$. The preparation method is carried out for 24 h at a temperature of 160-200° C. and with the addition of the additive sodium dodecylbenzene sulfonate. $Cu_2(OH)PO_4$ superstructures having a walnut-shaped configuration and a size of 3-4 μm are obtained.

Han et al., *Materials Letters* 166 (2016) 71-74, describes the hydrothermal synthesis of copper(II) hydroxide phosphate starting from $Cu(NO_3)_2$ and $Na_2HPO_4$. The preparation method is carried out at a temperature of 120° C. and with the addition of sodium dodecylbenzene sulfonate and polyvinylpyrrolidone. Elliptical-shaped $Cu_2(OH)PO_4$ crystals are obtained.

Hu et al. *Journal of Alloys and Compounds* 695 (2017) 561-566, relates to the hydrothermal synthesis of copper(II) hydroxide phosphate starting from $Cu(CH_3COO)_2$ and diammonium hydrogen phosphate. The preparation method is carried out for 6 h at a temperature oi 120° C. and with the addition of polyethylene glycol. Rose-shaped, rod-shaped or brick-shaped $Cu_2(OH)PO_4$ crystals are obtained.

As already explained, however, methods for preparing copper(II) hydroxide phosphate that do not require operation under pressure, i.e. proceed in an unpressurized manner, are also known from the prior art. These have the advantage of less preparation work since autoclaves are not needed for the operation. Furthermore, these methods are generally much quicker and/or can be carried out at lower reaction temperatures.

For example, unexamined German patent application No. 3 342 292 describes a method in which basic copper carbonate in an aqueous dispersion is treated with at least stoichiometric amounts of phosphoric acid at temperatures below 70° C., the resultant reaction mixture continues to be mechanically moved in the same temperature range, is then briefly heated to boiling point, and lastly the resultant copper(II) hydroxide phosphate is separated off. However, this method not only has very long reaction times of >10 h, but depending on the quality of the raw materials products having significant differences in colour shade are obtained. It is desirable, however, to have an almost colourless product with a uniform colour shade, particularly for the area of application of plastics additives.

DE 19 543 803 describes a method in which 85% phosphoric acid is added to an aqueous dispersion of copper(II) hydroxide, the reaction mixture is left to stand for around 1 h at 50° C. and is then heated to boiling point for 1 h. Once cooled, the resultant product is filtered off and dried. The method makes it possible to obtain copper(II) hydroxide phosphate in a comparatively simple and cost-effective process. However, the morphology of the copper(II) hydroxide phosphate cannot be influenced using this method. In addition, while the colour of the obtained product is relatively light, the copper(II) hydroxide phosphate (hereinafter: CHP) still has a light-green hue.

For some areas of application of the copper(II) hydroxide phosphate, however, it may be advantageous to control the morphology and specific surface area thereof in a targeted manner. For example, biological and/or catalytic properties of a compound generally depend on the structure and/or specific surface area thereof. It is also desirable to obtain copper(II) hydroxide phosphate having particular colour values, in particular low intrinsic colour and high lightness. This is particularly advantageous if copper(II) hydroxide phosphate is added to a composition, in particular a plastics composition, as an additive.

While, as described above, particular morphologies of the copper(II) hydroxide phosphate can be obtained through preparation by means of hydrothermal synthesis, this requires operation in pressure vessels (autoclaves) and at temperatures of >100° C., in most cases even above the critical point of the water.

OBJECT

Against this background, the object of the present invention was therefore to provide an unpressurized method for preparing copper(II) hydroxide phosphate by which the morphology and/or specific surface area of the product can be influenced and which makes it possible to prepare copper (II) hydroxide phosphate having higher lightness and/or lower intrinsic colour than the methods known from the prior art.

DESCRIPTION OF THE INVENTION

According to the invention, this object is achieved by a method for preparing copper(II) hydroxide phosphate having the following method steps:

a) producing a reaction mixture from an aqueous solution or dispersion of a copper(II) compound and a preferably at least stoichiometric amount of phosphoric acid, wherein "at least stoichiometric" means that the quantity of copper(II) ions of the copper(II) compound in relation to the quantity of phosphoric acid in the reaction mixture is at most 2, b) converting the copper(II) compound with the phosphoric acid in the reaction mixture and c) separating copper(II) hydroxide phosphate off from the reaction mixture, wherein the conversion in step b) is effected in an unpressurized manner, and the method is characterized in that a chelating agent is added to the reaction mixture in method step a) and/or b).

In a preferred embodiment of the invention, the ratio of the quantity of copper(II) ions of the copper(II) compound to the quantity of the phosphoric acid in the reaction mixture is at most 5, preferably at most 3, even more preferably at most 2.5 and most preferably at most 2. A ratio of 2 corresponds to a stoichiometric amount of phosphoric acid, which means that the ratio of phosphate ions to copper(II) ions in the reaction mixture is the same as in the product CHP ($Cu_2(OH)PO_4$). With such a ratio, the product can form particularly quickly and efficiently. Since phosphoric acid is more cost-effective compared with the copper(II) compound, in an advantageous embodiment the ratio of the quantity of copper(II) ions of the copper(II) compound to the quantity of the phosphoric acid is at most 2, preferably at most 1.8, more preferably at most 1.5, even more preferably at most 1 and most preferably at most 0.5. The inventors observed that the CHP formation rate can be increased even more by an excess of the cost-effective phosphoric acid.

According to the invention, the term "chelating agents" refers to substances that are capable of forming chelates. Chelates are cyclic coordination compounds that have at least one central metal atom or ion and a polydentate ligand, the "chelate ligand". A ligand is an ion or molecule that can bind, i.e. coordinate, to a central metal atom or ion by means of a coordinate bond. The distinction between a coordinate bond and the classic covalent bond is that the ligand in the coordinate bond provides both bonding electrons and is therefore what is known as a "Lewis base". In this context, "polydentate" means that the ligand has two or more coordination sites by means of which it coordinates to the metal atom or ion. In other words, the chelate ligand must therefore have two or more atom groups that can act as electron donors.

In a preferred embodiment of the invention, the chelate ligand has three or more, more preferably four or more, particularly preferably five or more and most preferably six or more coordination sites.

When dissolved or dispersed in the aqueous solvent or dispersion medium, the chelating agent produces a chelate ligand at least in part. Said chelate ligand can be charged or uncharged.

The central metal atom or ion has electron holes to which the ligands can coordinate with their free electron pairs; it is therefore what is known as a "Lewis acid". In the context of the invention, the central atom or ion is copper, which is provided in step a) of the reaction in the aqueous solution or dispersion by adding the copper(II) compound.

Without being bound to this theory, the inventors assume that through the addition of the chelating agent in step a) of the reaction, the copper(II) of the copper(II) compound is better stabilized in the solution or suspension. Depending on the bond strength of the various chelating agents, the stability of the copper(II) is influenced to different extents. As a result of this, the conversion of the copper(II) in step b) of the reaction is influenced, and thus so too is the crystallization of the product. This makes it possible to prepare crystals having a particular morphology and/or specific surface area.

The bond strength of the chelating agent depends substantially on the number of coordination sites and its "hardness".

Basically, the bond strength increases as the number of coordination sites increases. Chelate complexes are more stable than similar complexes having monodentate ligands that are not linked together. There are substantially two causes of this "chelate effect". Firstly, the formation of chelate complexes is advantageous in entropic terms because the number of molecules increases during the formation of the chelate complex, or at least decreases to a lesser extent than during the formation of similar complexes having monodentate ligands. Therefore, the number of the degrees of freedom of the system during the formation of chelate complexes is higher.

Secondly, a chelate ligand cannot be eliminated until after all the bonds have severed from the central atom, meaning that it is significantly more difficult for the chelate ligand to dissociate from the metal atom or ion. In addition, the likelihood of immediate recombination after splitting is also increased. Therefore, chelate complexes are more stable than similar complexes having monodentate ligands not only thermodynamically, but also kinetically. The aforementioned effects are even greater the more coordination sites the chelate ligand has for binding to the copper(II) centre.

However, the bond strength also depends on the "hardness" of the chelate ligand. According to the HSAB principle (the principle of hard and soft acids and bases, R. G. Pearson), the bond strength of a Lewis acid-base complex depends on the polarizability of the central atom and of the donor atom of the ligand. Basically, combinations of "hard" acids with "hard" bases, i.e. of compounds having molecules or ions that are poorly polarizable, have higher complex-formation constants than combinations of "hard" acids or bases with "soft" acids or bases. This is because these "hard"-"hard" bonds have a highly ionic bonding character.

"Soft"-"soft" combinations, i.e. combinations of easily polarizable molecules or ions having a low charge density, are generally also more stable than the "mixed" combinations, since these bonds are of a highly covalent nature.

Lewis acids can be classified systematically according to their hardness, which is determined substantially from the charge density, i.e. the (partial) charge divided by unit of volume of the ion/molecule. Soft acids are, for example, the singly charged, higher-period subgroup elements, such as $Au^+$ or $Ag^+$.

The hardness of the Lewis bases results substantially from the hardness of the donor atoms. The smaller, more electronegative and more highly oxidized the donor atom, the higher the hardness. Against this background, a hard Lewis base is, for example, $F^-$.

The doubly charged lower transition metals, such as $Fe^{2+}$ or $Cu^{2+}$, are to be classified as marginal cases between the classic hard Lewis acids (e.g. $Ti^{4+}$, $A^{3+}$) and the soft Lewis acids (e.g. $Ag^+$, $Hg^{2+}$).

From the above-mentioned fact that bonds between molecules/ions of similar polarizability are preferred, it follows that copper(II) preferably forms complexes with Lewis bases having semi-hard donor atoms (N, Cl).

By stabilizing the copper(II) of the copper(II) compound, said compound can be dispersed better in the solvent or dispersion medium. Impurities adhering to the copper(II) compound are likewise suspended or dissolve in this process. In the conversion in step b), therefore, these impurities are coprecipitated to a lesser extent than if no complexing agent were added to the reaction mixture. For this reason, products of higher purity are obtained. The copper(II) hydroxide phosphate from the method according to the invention thus has lower intrinsic colour and higher lightness.

In a preferred embodiment of the invention, at least two, preferably three or more, particularly preferably five chelating agents are added to the reaction mixture. The inventors have discovered that a combination of chelating agents of different substance classes leads to a synergistic effect. The combination of carboxylic and phosphoric acids or the derivatives thereof is particularly advantageous.

In the context according to the invention, "unpressurized" means that the pressure in the reaction vessel in step b) does not exceed the normal pressure of 1 bar significantly, i.e. by no more than 0.5 bar, or does so only for at most 50% of the time of conversion of the copper(II) compound with the phosphoric acid in the reaction mixture, preferably for at most 30% of the conversion time, even more preferably for at most 20% of the conversion time and most preferably for at most 10% of the conversion time. The term "conversion time" refers to the time until the copper(II) hydroxide phosphate separated off from the reaction mixture in step c) is obtained. Furthermore, the conversion temperature in step b) does not go significantly, i.e. no more than 10° C., beyond the boiling point of the solvent or dispersion medium. By contrast with solvo- or hydrothermal synthesis, therefore, operations need not be carried out in a pressure vessel.

Step a)

In step a) of the method, a reaction mixture consisting of an aqueous solution or dispersion of a copper(II) compound and a preferably at least stoichiometric amount of phosphoric acid is prepared. This can be done by first dispersing the copper(II) compound in an aqueous solvent or dispersion medium. The aqueous solvent or dispersion medium comprises, in relation to its total weight, at least 20% water, preferably at least 40%, particularly preferably at least 50%, even more preferably at least 70% and most preferably at least 90%. In a further embodiment, the aqueous solvent or dispersion medium consists of water. As a further constituent, the solvent or dispersion medium can comprise polar organic solvents such as (polyvalent) alcohols or amines. Polyvalent alcohols are particularly preferable as further constituents.

In a preferred embodiment of the invention, the copper(II) compound is first dissolved or suspended in the aqueous solvent or dispersion medium and only then is the preferably at least stoichiometric amount of phosphoric acid added, in such a way as to produce the reaction mixture.

In this context, it is particularly preferable for the chelating agent to be added to the aqueous solvent or dispersion medium before the phosphoric acid is added. This ensures that the copper(II) compound is fully stabilized before the conversion with phosphoric acid takes place in step b). The advantageous effects associated with the stabilization can thus be maximized.

Alternatively, the preferably at least stoichiometric amount of phosphoric acid can be dissolved or suspended in the aqueous solvent or dispersion medium and the copper(II) compound can be added thereto subsequently.

In a further embodiment of the invention, the phosphoric acid and the copper(II) compound are added to the solvent or dispersion medium at the same time in order to obtain the reaction mixture.

In a further embodiment of the invention, the phosphoric acid and the copper(II) compound are added to the solvent or dispersion medium alternately in partial amounts in a periodic or aperiodic manner in order to obtain the reaction mixture.

Step b)

In step b), the copper(II) compound reacts with the phosphoric acid in the reaction mixture. Steps a) and b) are not necessarily separate in time, but rather can also overlap. Namely, the conversion of the copper(II) compound with the phosphoric acid can start as early as when a partial amount of the copper(II) compound and/or of the phosphoric acid is added.

In an advantageous embodiment of the invention, however, steps a) and b) are separate in time, such that step b), i.e. the conversion of the copper(II) compound with the phosphoric acid, is only effected once the copper(II) compound and the phosphoric acid are fully dissolved or dispersed in the solvent or dispersion medium. This can be achieved in particular by keeping the reaction mixture below the temperature that is required to initiate the reaction of the copper(II) compound and phosphoric acid.

Separating steps a) and b) has the advantage that the conversion can be better tracked and controlled.

Step c)

In the final step, the copper(II) hydroxide phosphate is separated off from the reaction mixture. This can be done by means of common separation methods. Particularly preferably, the separation method is selected from the group consisting of filtration, evaporation, centrifuging, sedimentation and flotation.

Most preferably, the separation method is filtration. In this way, any impurities that are present in the solvent or dispersion medium in dissolved or finely dispersed form can be removed particularly efficiently.

In a preferred embodiment of the invention, the chelating agent is selected from the group consisting of amino, carboxylic, phosphoric, sulfuric and sulfonic acids and the salts, esters and amides thereof; polyvalent alcohols; nitriles; bipyridines; phenanthrolines; polyvalent phenols; polyvalent amines; polyvalent ethers; lactams; oximes; urea derivatives; polyvalent ketones and aldehydes such as acetylacetonate (acac); thiols such as dimercaptosuccinic acid (DMSA); and combinations of these.

Since copper(II) particularly preferably forms stable complexes with Lewis bases having semi-hard donor atoms such as N or Cl, the chelating agents are preferably those that comprise nitrogen as one or more donor atoms. Preferably, the chelating agents are therefore selected from the group consisting of amino acids, carboxylic acid amides, nitriles, bipyridines, phenanthrolines, polyvalent amines, urea derivatives, lactams and oximes.

Particularly preferably, the chelating agent is selected from the group consisting of ethylenediamine (en), 2-(2-aminoethylamino)ethanol (AEEA), diethylenetriamine (dien), iminodiacetate (ida), triethylenetetramine (trien, TETA), triaminotriethylamine (tren), nitrilotriacetate (nta), bis(salicylidene)ethylenediamine (salen), ethylenediaminetriacetate (ted), ethylenediaminetetraacetate (EDTA), diethylenetriaminepentaacetate (DTPA), 1,4,7,10-tetraazacyclododecane-1,4,7,10-tetraacetate (DOTA), dimethylglyoxime (dmg), 8-hydroxyquinoline (oxin), 2,2'-bipyridine (bpy), 1,10-phenanthroline (phen), tetrasodium iminodisuccinate (IDHA), methylglycinediacetic acid and combinations of these.

By adding Lewis bases having semi-hard donor atoms such as N, the copper(II) of the copper(II) compound is particularly well stabilized in the aqueous solvent or dispersion medium.

As a result, impurities can be particularly efficiently separated off since the particularly strong stabilization of the copper(II) means that the copper(II) compound is better dispersed in the solvent or dispersion medium and impurities are coprecipitated in step b) to a lesser extent.

In a preferred embodiment of the invention, the copper(II) compound is selected from the group consisting of copper (II) hydroxide, copper(II) sulfate, copper(II) carbonate, basic copper(II) carbonate, copper(II) halides and combinations of these. Particularly preferably, the copper(II) compound is selected from copper(II) fluoride, copper(II) chloride, copper(II) bromide, copper(II) hydroxide or copper(II) iodide and combinations of these. Most preferably, the copper(II) compound is copper(II) chloride or copper(II) hydroxide.

Copper(II) hydroxide and copper(II) halides, in particular copper(II) chloride, have the advantage of very wide availability while having comparatively low purchase prices.

Even though the copper(II) compound has a constituent, in particular an anion, that comes under the definition of a chelate ligand, supplying a copper(II) compound of this kind in step a) should not be taken to mean the addition according to the invention of a chelating agent. In other words, this means that the chelating agent is an additional reaction-mixture component that is to be separated from the copper (II) compound.

In a preferred embodiment of the invention, the chelating agent is an amino acid or the ester, amide or salt thereof. Particularly preferably, the chelating agent is the Na salt of an amino acid. This is advantageous since the Na salts of amino acids are generally particularly soluble in the aqueous solvent or dispersion medium. Amino acids have the advantage that they can stabilize the copper(II) of the copper(II) compound by means of both the carboxylic acid group and the amino group. Due to the particularly strong stabilization, very light copper(II) hydroxide phosphate having low intrinsic colour can be obtained.

In a preferred embodiment of the invention, the amino acid is added before the addition of the phosphoric acid, wherein the pH of the reaction mixture before the addition of the phosphoric acid is less than 7, preferably less than 5, even more preferably less than 4 and most preferably less than 3. This prevents the amino group of the amino acid from being present in protonated form and thus prevents coordination by means of the amino group from being impossible.

In a particularly preferred embodiment of the invention, the amino acid is a proteinogenic amino acid. Proteinogenic amino acids are those that are used in living organisms as protein building blocks during translation depending on the specification of genetic information. Particularly preferably, the proteinogenic amino acids are selected from the group consisting of alanine, asparagine, cysteine, glutamine, glycine, histidine, leucine, lysine, methionine, proline, serine, valine and combinations of these.

Proteinogenic amino acids are commercially available at particularly high purities. As a result, contamination of the copper(II) hydroxide phosphate due to foreign matter adhering to the chelating agent can be kept low. Particularly pure and light copper(II) hydroxide phosphate having low intrinsic colour is thus obtained.

By using amino acids as chelating agents, copper(II) hydroxide phosphate crystals in an elongate prism shape are obtained. These have coalesced to form larger elongate structures.

In a further preferred embodiment of the invention, the chelating agent is selected from the group of aminosulfonic acid, preferably from the group consisting of taurine and sulfanilic acid and the salts and esters thereof.

In a preferred embodiment of the invention, the chelating agent is a carboxylic acid or the ester, amide or salt thereof. In a preferred embodiment, the carboxylic acid is a polyvalent carboxylic acid, i.e. a carboxylic acid having a plurality of carboxylic acid groups. Particularly preferably, the carboxylic acid is a hydroxycarboxylic acid, in particular a fruit acid. Particularly preferably, the carboxylic acid, hydroxycarboxylic acid or the salt thereof is selected from the group consisting of formic acid, acetic acid, glycolic acid, lactic acid, benzoic acid, oxalic acid, tartaric acid, malic acid, citric acid, alkali metal citrates, in particular monosodium citrate, isocitric acid and trimesic acid.

Hydroxycarboxylic acids have the advantage that they can stabilize the copper(II) compound in the solvent or dispersion medium by means of both the carboxylic acid group and the hydroxyl group. As a result, the advantages associated with the stabilization are particularly pronounced.

In a further preferred embodiment of the invention, the chelating agent is selected from the group of saccharides, in particular from the group of mono-, oligo- and polysaccharides, including cyclodextrins.

Preferably, the saccharides are selected from the group consisting of hexoses such as glucose, fructose, mannose, galactose, pentoses such as ribose, xylose, lactose, maltose, saccharose, oligosaccharides, including cyclic oligosaccharides such as α-, β-, γ- or δ-cyclodextrins, or polysaccharides such as alginates.

Particularly preferably, the chelating agent is selected from the group consisting of saccharose, fructose and galactose; most preferably the chelating agent is saccharose.

Saccharides coordinate to copper(II) by means of the free electron pairs of the OH groups. Since saccharides comprise a plurality of OH groups and thus a plurality of coordination sites, they can stabilize the copper(II) of the copper(II) compound particularly well.

In addition, saccharides generally do not comprise aromatic molecule constituents or heteroatoms such as S and P. The intrinsic colour of saccharides is therefore extremely low. Residues of saccharides remaining in the product after the reaction therefore do not lead to significant discolouration of the product, meaning that a particularly light copper (II) hydroxide phosphate having low intrinsic colour is obtained.

In a further embodiment of the invention, the chelating agent is a polyol, in particular an alditol, i.e. a reduced form of a saccharide such as for example mannitol, lactitol, sorbitol, xylitol, threitol, erythritol or arabitol.

By using saccharides as chelating agents, copper(II) hydroxide phosphate crystals in a rod shape are obtained.

The inventors noted that by adding chelating agents having a plurality of coordination sites, i.e. more than 15 coordination sites, "broccoli"-like crystal structures are obtained. Chelating agents of this kind are, for example, polyphosphates, polyethers such as polyethylene glycols, polyethylene oxides and polypropylene glycols, polyvinylpyrrolidone and alginates.

In a further preferred embodiment, the chelating agent is selected from the group consisting of di- or polyphosphoric acid or the salts thereof. Preferably, the chelating agent is selected from the group consisting of alkali phosphates, alkali metaphosphates and alkali polyphosphates, quite particularly preferably $K_5P_3O_{10}$.

In a further preferred embodiment of the invention, the chelating agent is ascorbic acid. The inventors have discovered that by adding ascorbic acid, copper(II) hydroxide phosphates having a particularly high specific surface area can be prepared. These have a specific surface area of >10 $m^2/g$, preferably >15 $m^2/g$, particularly preferably >20 $m^2/g$, even more preferably >30 $m^2/g$ and most preferably >40 $m^2/g$.

Without being bound to this theory, the inventors assume that this is due to the fact that ascorbic acid can be easily oxidized, and so semi-stable complexes of ascorbic acid and copper(II) are produced in steps a) and/or b), which lead to highly porous end products. Similar results are also obtained with citric acid and/or the salts thereof, in particular in combination with phosphates as a further chelating agent.

In this respect, however, it is to be borne in mind that the addition of ascorbic acid and/or citric acid or the salts thereof should be no more than 3 wt.-%, preferably no more than 2 wt.-%, particularly preferably no more than 1.5 wt.-% and most preferably no more than 1 wt.-% in relation to the amount of copper(II) compound. Otherwise, the phase purity of the copper(II) hydroxide phosphate may be significantly below 100%.

In a preferred embodiment of the invention, the chelating agent is a surfactant, i.e. a surface-active substance that comprises both a hydrophobic molecule part, consisting of an organic radical, and a hydrophilic molecule part, comprising a polar group, wherein this group is preferably charged.

In a preferred embodiment, the surfactant is a non-ionic surfactant or an anionic surfactant. Particularly preferably, the hydrophilic molecule part comprises a carboxylate, sulfonate, hydroxyl, ether or ethoxylate group.

In a further preferred embodiment of the invention, the surfactant is selected from the group consisting of cationic surfactants such as tetraalkylammonium salts such as cetyltrimethylammonium bromide or cetyltrimethylammonium chloride, anionic surfactants such as alkyl carboxylates and amphoteric surfactants such as betaine.

By using amino acids as chelating agents, copper(II) hydroxide phosphate crystals in an elongate prism shape are obtained. These have coalesced to form star-shaped structures.

The chelating agent is added to the reaction mixture in order to stabilize the copper(II) compound. For this purpose, only a low concentration of chelating agent is generally required.

Since, in general, at least one part of the chelating agent remains in the product after the reaction, this can lead to discolouration of the product. In addition, an excessive amount of chelating agent is also to be avoided for cost reasons. Preferably, the total chelating agent added to the reaction mixture in step a) and/or b) is therefore no more than 5.0 wt.-%.

However, too little chelating agent has the disadvantage that the stabilising effect is only slight.

In a preferred embodiment of the invention, therefore, 0.1 to 5.0 wt.-% of the chelating agent is added to the reaction mixture in method step a) and/or b) in relation to the amount of the copper(II) compound.

Particularly preferably, the chelating agent is added in an amount of from 0.5 to 3.0 wt.-%, more preferably in an amount of from 1 to 3.0 wt.-% and most preferably in an amount of from 1 to 2.0 wt.-%.

By means of the method according to the invention, particularly pure copper(II) hydroxide phosphate can be obtained. This means copper(II) hydroxide phosphate having a phase purity of >90%, preferably >95%, more preferably >98%, particularly preferably >99% and most preferably >99.5%.

The phase purity can be determined using X-ray structure analysis in the following way.

The quantitative phase determination is effected by means of the Rietveld method as described in detail in "Quantitative phase analysis using the Rietveld method", D. L. Bish and S. A. Howard, J. Appl. Cryst. (1988) 21, 86-91, or the textbook "The Rietveld Method", chapter 1, "Introduction to the Rietveld method", R. A. Young, ed., Oxford University Press (1995). Preferably, the analysis is effected by means of pattern analysis software such as the Topas program from the company Bruker.

In a further preferred embodiment of the invention, the copper(II) hydroxide phosphate obtained in method step c) has an L value in the L*a*b* colour space (CIELAB) of >78, preferably >80, particularly preferably >82, even more preferably >85 and most preferably >87.

The L*a*b* colour space in accordance with DIN EN ISO 11664-4 is used to characterize all perceivable colours. In the three-dimensional L*a*b* colour space, the lightness value L* is arranged vertically on the planar colour plane (a*, b*).

On the a* axis, the colours green and red are opposites, whereas the b* axis separates blue and yellow. Complementary colours are thus 180° opposite each other. The L* axis defines the lightness of the colour and covers values from 0 to 100, wherein 100 represents the highest lightness.

Some of the most important properties of the L*a*b* colour model are that it is device-independent and is based on perception. In other words, colours are defined as they are perceived by a normal observer in standard lighting conditions, regardless of how they are produced or the technology used to display them.

In the context of the present invention, the L*a*b* values were determined as follows.

The L*a*b* values were determined by means of an UltraScan VIS spectral photometer from the company HunterLab. To do so, the samples were poured into a glass cuvette and a homogeneous surface was created on the cuvette side with respect to the measurement opening by striking the cuvette or compacting the sample.

In a further preferred embodiment of the invention, the copper(II) hydroxide phosphate obtained in method step c) consists of particles that have a median particle size in the range of from 2 to 10 μm, preferably from 2 to 8 μm, particularly preferably from 2 to 7 μm, even more preferably from 2 to 6 μm and most preferably from 2 to 5 μm, after determination using laser diffraction analysis in accordance with DIN-ISO 13320-1.

In the context of the present invention, the particle sizes were determined in accordance with the currently valid DIN-ISO 13320-1. To do so, a sample of the prepared product is dispersed in a dispersion medium (2-propanol or a solution of tetrasodium pyrophosphate in demineralized water, 14 mmol/L) and wet-measured using a Horiba LA-950V in a measurement range of from 0.01 am to 3000 μm.

In a further preferred embodiment of the invention, the copper(II) hydroxide phosphate obtained in method step c) consists of particles that are rod-shaped, wherein the aspect ratio is in the range of from 1:3 to 1:10.

According to the invention, the term "aspect ratio" refers to the ratio of the largest elongate extension of the particle to its smallest extension.

The invention further relates to copper(II) hydroxide phosphate that is obtainable by the method according to the invention, wherein the copper(II) hydroxide phosphate has an L value in the L*a*b* colour space (CIELAB) of >78, preferably >80, particularly preferably >82, even more preferably >85 and most preferably >87.

The invention further relates to the use of a chelating agent in the production of copper(II) hydroxide phosphate by converting a copper(II) compound with phosphoric acid in order to change the crystal properties of the produced copper(II) hydroxide phosphate.

EXAMPLES

The invention will now be explained on the basis of specific embodiments of preparation examples according to the invention.

Starting Materials:

| Name | Manufacturer | Purity/$M_n$ | CAS |
|---|---|---|---|
| Copper(II) hydroxide | VWR | >98% | 20427-59-2 |
| Phosphoric acid | Chemische Fabrik Budenheim | ≥75 wt.-% | 7664-38-2 |

Measurement Methods:

Particle Size Determination Media. D10, D90

The particle size distributions were determined in terms of both volume and particle size through dynamic light diffraction on a Horiba Partica LA-950V (Horiba, Ltd.; Kyoto; Japan). To do so, a sample of the prepared product is dispersed in a dispersion medium (2-propanol or a solution of tetrasodium pyrophosphate in demineralized water, 14 mmol/L) and wet-measured using a Horiba LA-950V in a measurement range of from 0.01 μm to 3000 μm.

Phase Purity

The phase purity is determined using X-ray structure analysis. The products prepared in accordance with the following examples underwent X-ray diffraction measurements (XRD) on a diffractometer, model D8 Advance A25 (Bruker) using $CuK_\alpha$ radiation. The quantitative phase determination is effected by means of the Rietveld method (see "Quantitative phase analysis using the Rietveld method", D. L. Bish and S. A. Howard, J. Appl. Cryst. (1988) 21, 86-91, or the textbook "The Rietveld Method", chapter 1, "Introduction to the Rietveld method", R. A. Young, ed., Oxford University Press (1995)) by means of the pattern analysis program Topas 4.2. from the company Bruker.

L*a*b* Values

The L*a*b* values were determined by means of an UltraScan VIS-2 spectral photometer equipped with the Ultra Sensor VIS sensor from the company HunterLab. To do so, the samples were poured into a glass cuvette and a homogeneous surface was created on the cuvette side with respect to the measurement opening by striking the cuvette or compacting the sample. The associated software Easy Match QC 4.64 uses the settings "USVIS 1145" sensor and "RSIN Mode" and calculates the LAB values.

The method is effected in accordance with the currently valid version of EN ISO 11664-4.

Specific Surface Area

The specific surface area was determined in accordance with the BET method using $N_2$ absorption (DIN ISO 9277) on a BELSORP-mini machine from the company BEL. Nitrogen of 99.999% purity was used.

Scanning Electron Microscopy

For scanning electron microscope (SEM) images, a Sigma EVO SEM spectrometer from the company Zeiss was used in combination with an INCA Energy 350 EDX detector from the company Oxford.

General Description of the Experiment 150 g $Cu(OH)_2$ (1.54 mol) is suspended in 2250 ml distilled water, producing a blue-coloured suspension. This is heated to 90° C., 120 g phosphoric acid (75 wt-%, 0.92 mol) and the amount of one or more additives according to Table 1 are added, and the reaction mixture is heated to boiling point. After 15 minutes, the raw product is filtered off, resuspended in 1000 ml water, filtered again and dried overnight at 105° C. in a drying oven.

TABLE 1

| # | Additive | Wt. [%] | L* | a* | b* | Δ a – b | SA [m²/g] | D10 [μm] | D50 [μm] | D90 [μm] | Pur [%] | Shape |
|---|---|---|---|---|---|---|---|---|---|---|---|---|
| 0 | — | — | 75.8 | -4.1 | 10.6 | 14.7 | n.d. | 3.1 | 5.8 | 9.7 | 100 | EP[3] |
| 1 | Na5P3O10 | 1 | 82.9 | -10.2 | 9.3 | 19.5 | 0.6 | 3.8 | 6.1 | 9.6 | 100 | EP[3] |
| 2 | Glycine | 0.5 | 86.8 | -7.7 | 5.2 | 12.9 | 3.3 | 1.1 | 3.1 | 5.8 | 100 | EP[3] |
| 3 | Glycine | 1 | 87.3 | -7.49 | 4.78 | 12.3 | 3.9 | 0.8 | 2.6 | 5.4 | 100 | EP[3] |
| 4 | Taurine | 1 | 86.7 | -6.6 | 6.6 | 13.2 | 2.2 | 1.4 | 3.7 | 6.7 | 100 | ST[4] |
| 5 | CTAB[1] | 1 | 87 | -6.1 | 6.9 | 13.0 | 1.4 | 1.7 | 4.4 | 8.2 | 100 | ST[4] |
| 6 | Saccharose | 0.2 | 84.7 | -4.7 | 7.7 | 12.4 | n.d. | 1.6 | 3.8 | 6.9 | 100 | n.d.[5] |
| 7 | Saccharose | 1 | 85.7 | -5.7 | 6.4 | 12.1 | n.d. | 1.6 | 4.4 | 8.1 | 100 | EP[3] |
| 8 | PEG-400 | 1 | 84.8 | -6.0 | 8.0 | 14 | 1.5 | 3.4 | 6.4 | 10.9 | 100 | EP[3] |
| 9 | PEG-6000 | 1 | 85.9 | -6.7 | 7.4 | 14.4 | 1.7 | 2.9 | 6.7 | 12.1 | 100 | EP[3] |
| 10 | Na3P3O9 | 1 | 83.3 | -6.6 | 7.9 | 14.5 | n.d. | 2.8 | 4.7 | 7.2 | 100 | EFP[2] |
| 11 | Na3P3O9 + Na citrate | 1 0.5 | 91.9 | -5.0 | 2.6 | 7.5 | 5.53 | 0.3 | 2.4 | 5.5 | 100 | EP[3] |

[1]Cetyltrimethylammonium bromide

[2]EFP = elongate prisms, highly fragmented (consists of many crystals that have coalesced lengthways), partly coalesced

[3]EP = elongate prisms, partly coalesced

[4]ST = stars from crystals that have coalesced lengthways

[5]n.d. = not determined

The invention claimed is:

1. A method for preparing copper(II) hydroxide phosphate comprising:
   a) producing a reaction mixture from an aqueous solution or dispersion of a copper(II) compound and phosphoric acid,
   b) converting the copper(II) compound with the phosphoric acid in the reaction mixture, and phosphoric acid
   c) separating copper(II) hydroxide phosphate from the reaction mixture,
   wherein the conversion in step b) is effected in an unpressurized manner,
   wherein at least one chelating agent is added to the reaction mixture in method step a) and/or b), wherein if the chelating agent is a phosphoric acid or a salt thereof, the phosphoric acid or the salt is a di- or polyphosphoric acid or a salt thereof.

2. The method according to claim 1, wherein the at least one chelating agent is selected from the group consisting of amino, carboxylic, phosphoric, sulfuric and sulfonic acids and the salts, esters and amides thereof, polyvalent alcohols, nitriles, bipyridines, phenanthrolines, polyvalent phenols, polyvalent amines, polyvalent ethers, lactams, oximes, urea derivatives, polyvalent ketones and aldehydes, thiols, and combinations thereof.

3. The method according to claim 1, wherein the copper (II) compound is selected from the group consisting of copper(II) hydroxide, copper(II) sulfate, copper(II) carbonate, basic copper(II) carbonate, copper(II) halides, and combinations thereof.

4. The method according to claim 1, wherein the at least one chelating agent is an amino acid or the salt thereof, wherein the amino acid is selected from the group of proteinogenic amino acids.

5. The method according to claim 1, wherein the at least one chelating agent is a carboxylic acid, a hydroxycarboxylic acid or the salt thereof, wherein the carboxylic acid or hydroxycarboxylic acid is selected from the group consisting of formic acid, acetic acid, glycolic acid, lactic acid, benzoic acid, oxalic acid, tartaric acid, malic acid, citric acid, isocitric acid, trimesic acid and combinations thereof.

6. The method according to claim 1, wherein the at least one chelating agent is a saccharide selected from the group consisting of mono- and oligosaccharides.

7. The method according to claim 1, wherein the at least one chelating agent is ascorbic acid.

8. The method according to claim 1, wherein the at least one chelating agent is a surfactant.

9. The method according to claim 1, wherein the at least one chelating agent is added in a total amount of chelating agents of from 0.1 to 5.0 wt.-% in relation to the amount of the copper(II) compound.

10. The method according to claim 1, wherein the copper (II) hydroxide phosphate obtained in method step c) has a phase purity of >95%.

11. The method according to claim 1, wherein in the CIELAB L*a*b* colour space in accordance with DIN EN ISO 11664-4, the copper(II) hydroxide phosphate obtained in method step c) has an L* value of >80.

12. The-method according to claim 1, wherein the copper (II) hydroxide phosphate obtained in method step c) consists of particles that have a median particle size in the range of from 2 to 10 μm after determination using laser diffraction analysis in accordance with DIN-ISO 13320-1.

13. The method according to claim 1, wherein the copper (II) hydroxide phosphate obtained in method step c) consists of particles that are rod-shaped, wherein the aspect ratio is in the range of from 1:3 to 1:10.

14. A copper(II) hydroxide phosphate prepared by the method according to claim 1, wherein the copper(II) hydroxide phosphate has an L value in the L*a*b* colour space of >78.

15. A method for preparing copper(II) hydroxide phosphate comprising:
   a) producing a reaction mixture from an aqueous solution or dispersion of a copper(II) compound and phosphoric acid,
   b) converting the copper(II) compound with the phosphoric acid in the reaction mixture and
   c) separating copper(II) hydroxide phosphate from the reaction mixture,
   wherein the conversion in step b) is effected in an unpressurized manner,
   wherein at least one chelating agent is added to the reaction mixture in method step a) and/or b), and
   wherein the copper(II) hydroxide phosphate obtained in method step c):
      i) has a phase purity of >95%,
      ii) has an L* value of >80 in the CIELAB L*a*b* colour space in accordance with DIN EN ISO 11664-4,
      iii) consists of particles that have a median particle size in the range of from 2 to 10 μm after determination using laser diffraction analysis in accordance with DIN-ISO 13320-1, and/or
      iv) consists of particles that are rod-shaped, wherein the aspect ratio is in the range of from 1:3 to 1:10.

16. A copper(II) hydroxide phosphate prepared by the method according to claim 15, wherein the copper(II) hydroxide phosphate has an L value in the L*a*b* colour space of >78.

* * * * *